(12) United States Patent
Zones

(10) Patent No.: US 11,161,750 B1
(45) Date of Patent: Nov. 2, 2021

(54) MOLECULAR SIEVE SSZ-121, ITS SYNTHESIS AND USE

(71) Applicant: CHEVRON U.S.A. INC., San Ramon, CA (US)

(72) Inventor: Stacey Ian Zones, San Francisco, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 17/236,052

(22) Filed: Apr. 21, 2021

Related U.S. Application Data

(60) Provisional application No. 63/030,982, filed on May 28, 2020.

(51) Int. Cl.
| | | |
|---|---|---|
| *C01B 39/48* | (2006.01) | |
| *B01J 29/70* | (2006.01) | |
| *B01J 29/04* | (2006.01) | |
| *C01B 39/08* | (2006.01) | |
| *C01B 39/46* | (2006.01) | |
| *C01B 39/24* | (2006.01) | |

(52) U.S. Cl.
CPC ............ *C01B 39/48* (2013.01); *B01J 29/047* (2013.01); *B01J 29/70* (2013.01); *C01B 39/085* (2013.01); *C01B 39/24* (2013.01); *C01B 39/46* (2013.01); *C01P 2002/72* (2013.01)

(58) Field of Classification Search
CPC ...... C01B 39/085; C01B 39/48; B01J 29/047; B01J 29/70; C01P 2002/72
See application file for complete search history.

(56) References Cited

U.S. PATENT DOCUMENTS

| | | | |
|---|---|---|---|
| 9,908,108 B2 * | 3/2018 | Davis | B01J 37/04 |
| 2010/0260665 A1 | 10/2010 | Archer et al. | |
| 2018/0260665 A1 * | 9/2018 | Zhang | G06K 9/6276 |

OTHER PUBLICATIONS

Vinaches et al, "An Introduction to Zeolite Synthesis Using Imidazolium-Based Cations as Organic Structure-Directing Agents", Molecules 2017, 22, 1307; doi:10.3390/molecules22081307 (Year: 2017) (Year: 2017).*

* cited by examiner

*Primary Examiner* — David M Brunsman

(57) ABSTRACT

A novel synthetic crystalline aluminogermanosilicate molecular sieve material, designated SSZ-121, is provided. SSZ-121 can be synthesized using 1,3-bis(1-adamantyl) imidazolium cations as a structure directing agent. SSZ-121 may be used in organic compound conversion reactions and/or sorptive processes.

13 Claims, 3 Drawing Sheets

MOLECULAR SIEVE SSZ-121, ITS SYNTHESIS AND USE

CROSS-REFERENCE TO RELATED APPLICATIONS

This application claims priority to and the benefit of U.S. Provisional Application Ser. No. 63/030,982, filed May 27, 2020.

FIELD

This disclosure relates to a novel synthetic crystalline aluminogermanosilicate molecular sieve designated SSZ-121, its synthesis, and its use in organic compound conversion reactions and sorption processes.

BACKGROUND

Molecular sieves are a commercially important class of materials that have distinct crystal structures with defined pore structures that are shown by distinct X-ray diffraction patterns and have specific chemical compositions. The crystal structure defines cavities and pores that are characteristic of the specific type of molecular sieve.

According to the present disclosure, a new crystalline aluminogermanosilicate molecular sieve, designated SSZ-121 and having a unique powder X-ray diffraction pattern, has been synthesized using 1,3-bis(1-adamantyl)imidazolium cations as a structure directing agent.

SUMMARY

In a first aspect, there is provided a molecular sieve having, in its as-synthesized form, a powder X-ray diffraction pattern with at least the following 2-theta scattering angles: 6.3±0.2, 7.0±0.2, 9.5±0.2, 13.0±0.2, 16.0±0.2, 18.5±0.2, 19.8±0.2, 21.2±0.2, 24.0±0.2, 25.0±0.2, 26.5±0.2, 28.5±0.2 and 30.0±0.2 degrees 2-theta.

In its as-synthesized and anhydrous form, the molecular sieve can have a chemical composition comprising the following molar relationship:

|  | Broadest | Secondary |
| --- | --- | --- |
| $(SiO_2 + GeO_2)/Al_2O_3$ | ≥30 | ≥50 |
| $Q/(SiO_2 + GeO_2)$ | >0 to 0.1 | >0 to 0.1 | wherein Q comprises 1,3-bis(1-adamantyl)imidazolium cations.

In a second aspect, there is provided a molecular sieve having, in its calcined form, a powder XRD pattern with at least the following 2-theta scattering angles: 6.5±0.2, 9.5±0.2, 13.0±0.2, 18.5±0.2, 19.8±0.2, 21.2±0.2, 24.0±0.2, 25.0±0.2, 26.5±0.2, 28.5±0.2 and 30.0±0.2 degrees 2-theta.

In its calcined form, the molecular sieve can have a chemical composition comprising the following molar relationship:

$Al_2O_3:(n)(SiO_2+GeO_2)$ wherein n is ≥30.

In a third aspect, there is provided a method of synthesizing the molecular sieve described herein, the method comprising (1) preparing a reaction mixture comprising: (a) a FAU framework type zeolite; (b) a source of germanium; (c) a structure directing agent comprising 1,3-bis(1-adamantyl)imidazolium cations (Q); (d) a source of fluoride ions; and (e) water; and (2) subjecting the reaction mixture to crystallization conditions sufficient to form crystals of the molecular sieve.

In a fourth aspect, there is provided a process of converting a feedstock comprising an organic compound to a conversion product which comprises contacting the feedstock at organic compound conversion conditions with a catalyst comprising the molecular sieve described herein.

DETAILED DESCRIPTION

Definitions

Figure 1:
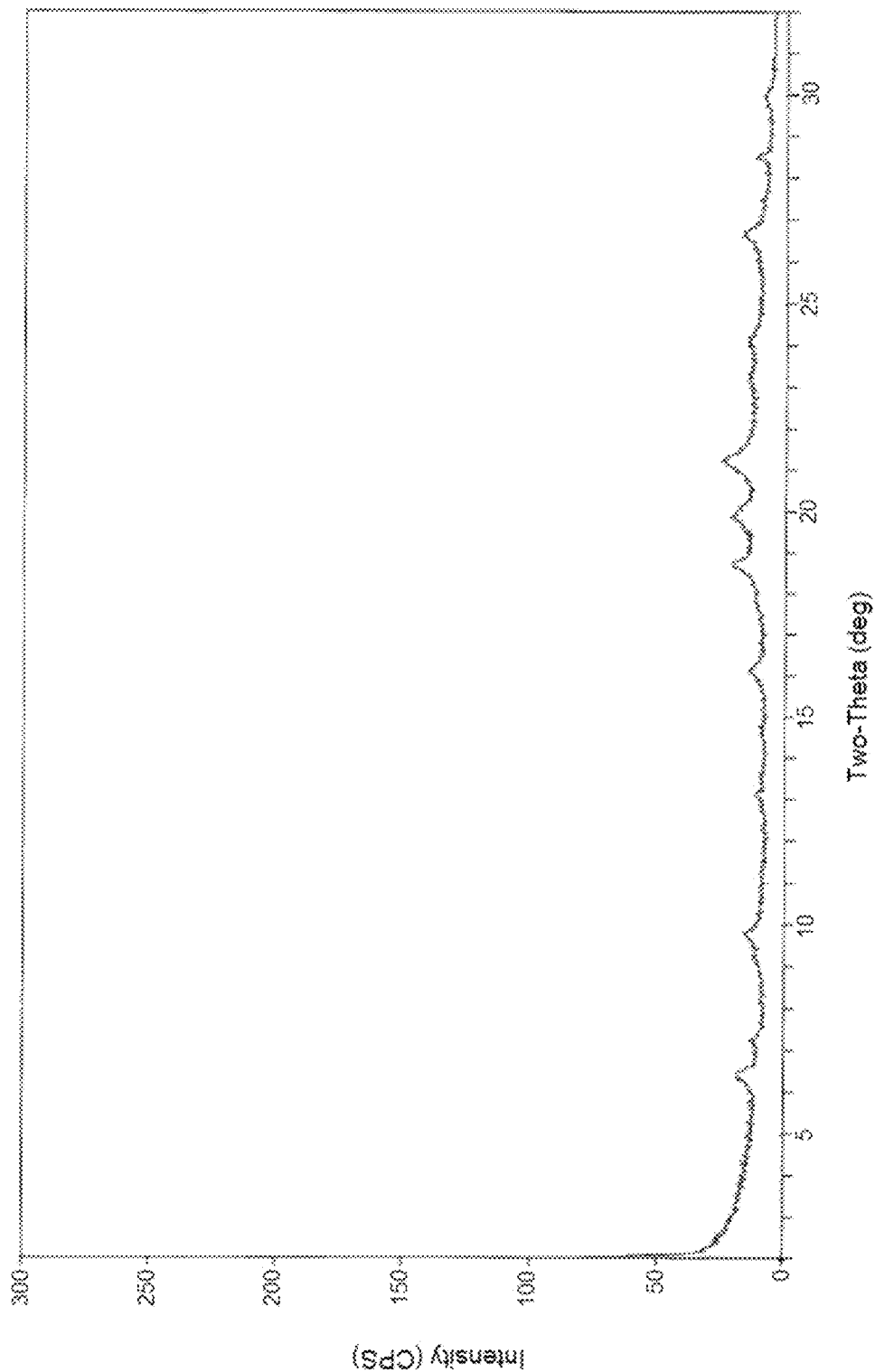
FIG. 1 shows a powder X-ray diffraction (XRD) pattern of the as-synthesized molecular sieve of Example 1.

The term "framework type" has the meaning described in the "*Atlas of Zeolite Framework Types*" by Ch. Baerlocher, L. B. McCusker and D. H. Olsen (Elsevier, Sixth Revised Edition, 2007).

The term "zeolite" refers a synthetic aluminosilicate molecular sieve having a framework constructed of alumina and silica (i.e., repeating $AlO_4$ and $SiO_4$ tetrahedral units).

The term "aluminogermanosilicate" refers to a molecular sieve having a framework constructed of $AlO_4$, $GeO_4$ and $SiO_4$ tetrahedral units. The aluminogermanosilicate may contain only the named oxides, in which case, it may be described as a "pure aluminogermanosilicate" or it may contain other oxides as well.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

Synthesis of the Molecular Sieve

Molecular sieve SSZ-121 can be synthesized by: (1) preparing a reaction mixture comprising (a) a FAU framework type zeolite; (b) a source of germanium; (c) a structure directing agent comprising 1,3-bis(1-adamantyl)imidazolium cations (Q); (d) a source of fluoride ions; and (e) water; and (2) subjecting the reaction mixture to crystallization conditions sufficient to form crystals of the molecular sieve.

The reaction mixture can have a composition, in terms of molar ratios, within the ranges set forth in Table 1:

TABLE 1

| Reactants | Broadest | Secondary |
| --- | --- | --- |
| $(SiO_2 + GeO_2)/Al_2O_3$ | 30 to 600 | 60 to 500 |
| $Q/(SiO_2 + GeO_2)$ | 0.10 to 1.00 | 0.20 to 0.70 |
| $F/(SiO_2 + GeO_2)$ | 0.10 to 1.00 | 0.20 to 0.70 |
| $H_2O/(SiO_2 + GeO_2)$ | 2 to 10 | 4 to 8 | wherein Q comprises 1,3-bis(1-adamantyl)imidazolium cations.

The FAU framework type zeolite can be an ammonium-form zeolite or a hydrogen-form zeolite. Examples of the FAU framework type zeolite include zeolite Y (e.g., CBV720, CBV760, CBV780, HSZ-HUA385, and HSZ-HUA390). Zeolite Y can have a $SiO_2/Al_2O_3$ molar ratio of from 30 to 500. The FAU framework type zeolite can comprise two or more zeolites. The two or more zeolites can be Y zeolites having different silica-to-alumina molar ratios. The FAU framework type zeolite can be the sole or predominant source of silicon and aluminum to form the aluminogermanosilicate molecular sieve. In some aspects, a separate source of silicon may be added. Separate sources of silicon include colloidal silica, fumed silica, precipitated silica, alkali metal silicates and tetraalkyl orthosilicates.

Suitable sources of germanium include germanium oxide and germanium alkoxides (e.g., germanium ethoxide, germanium isopropoxide).

Silicon and germanium may be present in the reaction mixture in a $SiO_2/GeO_2$ molar ratio of from 4 to 12 (e.g., 6 to 10).

Suitable sources of fluoride ions include hydrogen fluoride, ammonium fluoride and ammonium bifluoride.

The structure directing agent comprises 1,3-bis(1-adamantyl)imidazolium cations (Q), represented by the following structure (1):

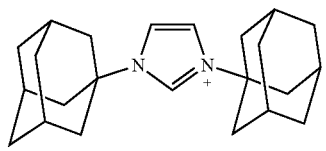

(1)

Suitable sources of Q are the hydroxides, chlorides, bromides, and/or other salts of the quaternary ammonium compound.

The reaction mixture can have a Q/F molar ratio in a range of from 0.80 to 1.20 (e.g., 0.85 to 1.15, 0.90 to 1.10, 0.95 to 1.05, or 1 to 1).

The reaction mixture can contain seeds of a molecular sieve material, such as SSZ-121 from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-121 over any undesired phases.

It is noted that the reaction mixture components can be supplied by more than one source. Also, two or more reaction components can be provided by one source. The reaction mixture can be prepared either batchwise or continuously.

Crystallization and Post-Synthesis Treatment

Crystallization of the molecular sieve from the above reaction mixture can be carried out under either static, tumbled or stirred conditions in a suitable reactor vessel (e.g., a polypropylene jar or a Teflon-lined or stainless-steel autoclave) at a temperature of from 100° C. to 200° C. (e.g., 150° C. to 175° C.) for a time sufficient for crystallization to occur at the temperature used (e.g., 1 day to 14 days, or 2 days to 10 days). The hydrothermal crystallization process is typically conducted under pressure, such as in an autoclave, and is preferably under autogenous pressure.

Once the molecular sieve crystals have formed, the solid product can be recovered from the reaction mixture by standard mechanical separation techniques such as centrifugation or filtration. The recovered crystals are water-washed and then dried to obtain the as-synthesized molecular sieve crystals. The drying step can be performed at an elevated temperature (e.g., 75° C. to 150° C.) for several hours (e.g., about 4 to 24 hours). The drying step can be performed under vacuum or at atmospheric pressure.

As a result of the crystallization process, the recovered crystalline molecular sieve product contains within its pore structure at least a portion of the structure directing agent used in the synthesis.

The as-synthesized molecular sieve may also be subjected to treatment to remove part or all of the structure directing agent used in its synthesis. This is conveniently effected by thermal treatment (i.e., calcination) in which the as-synthesized material is heated at a temperature of at least about 370° C. for at least 1 minute and generally not longer than 20 hours. While sub-atmospheric pressure can be employed for the thermal treatment, atmospheric pressure is desired for reasons of convenience. The thermal treatment can be performed at a temperature up to about 925° C. The thermal treatment may be carried out in an atmosphere selected from air, nitrogen or mixture thereof. For example, the thermal treatment may be conducted at a temperature of from 400° C. to 600° C. in air for a time period of from 3 to 8 hours. Alternatively, the structure directing agent Q can be removed by treatment with ozone. The ozone treatment may include heating the as-synthesized molecular sieve in the presence of ozone, such heating may be at a temperature of from 50° C. to 350° C. (e.g., from 100° C. to 300° C., or from 125° C. to 250° C.).

Any extra-framework metal cations in the molecular sieve can be replaced in accordance with techniques well known in the art (e.g., by ion exchange) with other cations. Replacing cations can include metal ions, hydrogen ions, hydrogen precursor (e.g., ammonium) ions, and combinations thereof.

Characterization of the Molecular Sieve

In its as-synthesized and anhydrous form, molecular sieve SSZ-121 can have a chemical composition comprising the following molar relationship set forth in Table 2:

TABLE 2

|  | Broadest | Secondary |
|---|---|---|
| $(SiO_2 + GeO_2)/Al_2O_3$ | ≥30 | ≥50 |
| $Q/(SiO_2 + GeO_2)$ | >0 to 0.1 | >0 to 0.1 | wherein Q comprises 1,3-bis(1-adamantyl)imidazolium cations. In some aspects, the molecular sieve can have a $SiO_2/GeO_2$ molar ratio in a range of from 4 to 12 (e.g., from 6 to 10).

In its calcined form, molecular sieve SSZ-121 can have a chemical composition comprising the following molar relationship:

$Al_2O_3$:($n$)($SiO_2$+$GeO_2$) 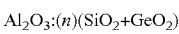

wherein n is ≥30 (e.g., 30 to 500, 30 to 250, 30 to 150, ≥50, 50 to 250, or 50 to 150).

In its as-synthesized form, molecular sieve SSZ-121 exhibits a powder XRD pattern with at least the following 2-theta scattering angles: 6.3±0.2, 7.0±0.2, 9.5±0.2, 13.0±0.2, 16.0±0.2, 18.5±0.2, 19.8±0.2, 21.2±0.2, 24.0±0.2, 25.0±0.2, 26.5±0.2, 28.5±0.2 and 30.0±0.2 degrees 2-theta. In its calcined form, molecular sieve SSZ-121 exhibits a powder XRD pattern with at least the following 2-theta scattering angles: 6.5±0.2, 9.5±0.2, 13.0±0.2, 18.5±0.2, 19.8±0.2, 21.2±0.2, 24.0±0.2, 25.0±0.2, 26.5±0.2, 28.5±0.2 and 30.0±0.2 degrees 2-theta.

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

INDUSTRIAL APPLICABILITY

Molecular sieve SSZ-121 (where part or all of the structure directing agent is removed) may be used as a sorbent or as a catalyst to catalyze a wide variety of organic compound conversion processes including many of present commercial/industrial importance. Examples of chemical conversion processes which are effectively catalyzed by SSZ-121, by itself or in combination with one or more other catalytically active substances including other crystalline catalysts, include those requiring a catalyst with acid activity. Examples of organic conversion processes which may be catalyzed by SSZ-121 include aromatization, cracking, hydrocracking, disproportionation, alkylation, oligomerization, and isomerization.

As in the case of many catalysts, it may be desirable to incorporate SSZ-121 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-121 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-121 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-121 also include inorganic oxides, such as silica, zirconia, titania, magnesia, beryllia, alumina, and mixtures thereof.

In addition to the foregoing materials, SSZ-121 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-121 and inorganic oxide matrix may vary widely, with the SSZ-121 content ranging from 1 to 90 wt. % (e.g., 2 to 80 wt. %) of the composite.

EXAMPLES

The following illustrative examples are intended to be non-limiting.

Example 1

Synthesis of SSZ-121

Into a tared 23 mL Parr reactor was added 0.27 g of Tosoh HSZ-390HUA Y-zeolite ($SiO_2/Al_2O_3$ molar ratio=500), 0.05 g of $GeO_2$ and 2.5 mmoles of an aqueous 1,3-bis(1-adamantyl)imidazolium hydroxide solution. The reactor was then placed in a vented hood and water was allowed to evaporate to bring the $H_2O/(SiO_2+GeO_2)$ molar ratio to 7 (as determined by the total mass of the suspension). Then, 2.5 mmoles of HF was added and the reactor was heated to 160° C. with tumbling at 43 rpm for about 7 days. The solid products were recovered by centrifugation, washed with deionized water and dried at 95° C.

Powder XRD of the product gave the pattern indicated in FIG. 1 and showed the product to be a pure form of a new phase, SSZ-121. Small crystal size is inferred from the peak broadening in the powder XRD pattern.

Figure 2:
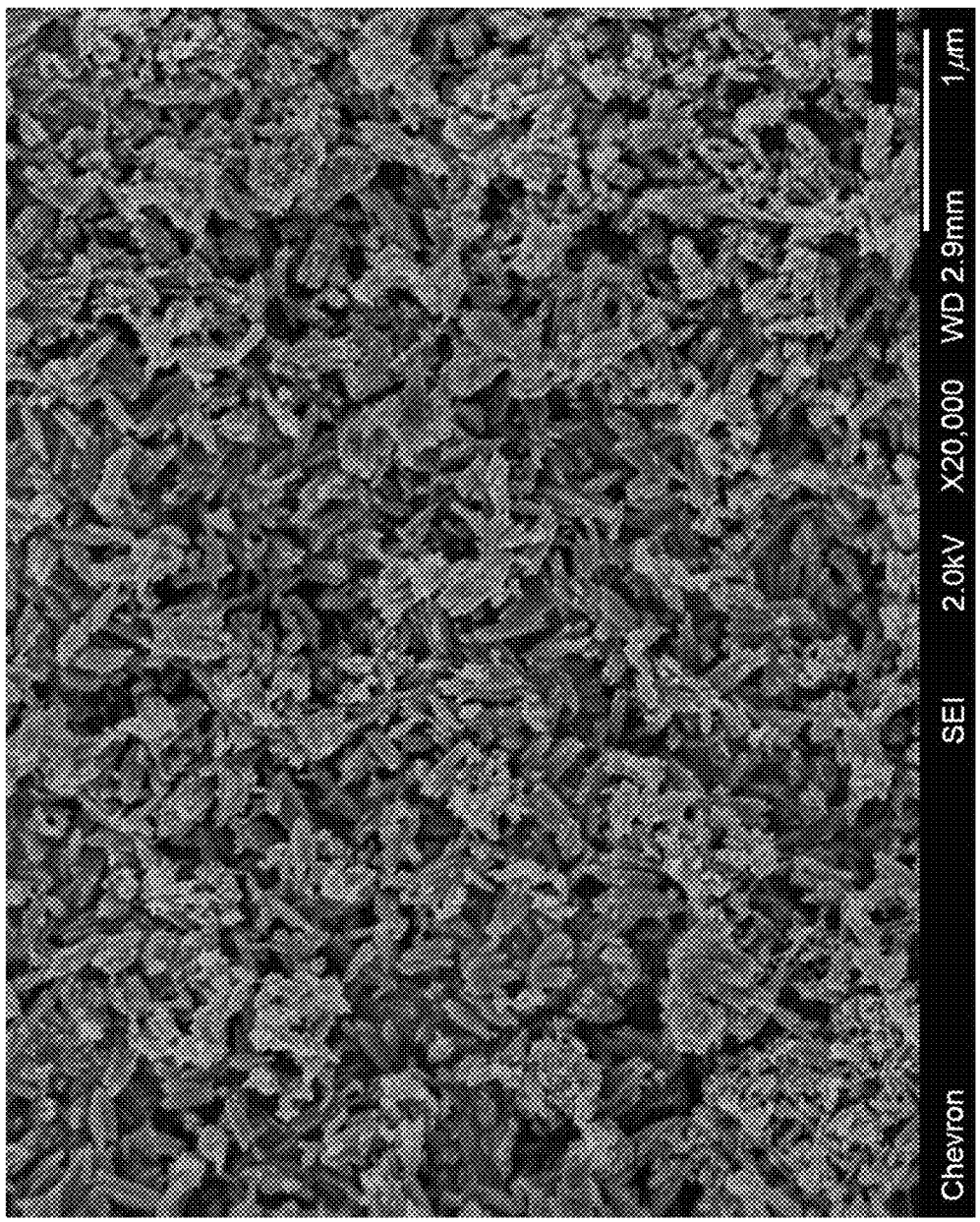
FIG. 2 shows a Scanning Electron Microscopy (SEM) image of the as-synthesized molecular sieve of Example 1.

FIG. 2 provides a SEM image of the product and shows that the product comprises uniform small rods.

Example 2

Calcination of SSZ-121

The as-synthesized molecular sieve of Example 1 was calcined inside a muffle furnace under a flow of air heated to 550° C. at a rate of 1° C./minute and held at 550° C. for 5 hours, cooled and then analyzed by powder XRD.

Analysis of the calcined product by the t-plot method of nitrogen physisorption shows the sample had a micropore volume of 0.144 $cm^3/g$.

Example 3

Uptake of Diisopropyl Azodicarboxylate

Micropore characterization of SSZ-121 was evaluated spectrophotometrically by uptake of the chromophore diisopropyl azodicarboxylate (DIAD), according to the method described by L-T. Yuen et al. (*Micropor. Mater.* 1997, 12, 229-249). Molecular sieves were used in their hydrogen form.

Each molecular sieve was pressed in a dye to 2000 psi and the pellet broken and meshed (24-40) before drying in a furnace at 575° F. for 2-4 hours just prior to use. The sample was removed, placed in a dessicator and allowed to cool. Meshed material (60 mg) was weighed out rapidly and placed in the pre-calibrated spectroscopy system.

A solution of DIAD in spectral grade isooctane (0.127 g DIAD/70 mL isooctane), corresponding to an absorbance of 0.45 at 406 nm ($\lambda_{max}$), was recirculated through the zeolite hold basket in the spectroscopy system every 23 seconds. Data were acquired continuously. Runs were carried out at ambient temperature and for a duration of 18 hours, at which time almost all experiments had reached an uptake equilibrium, where no further changes in absorbance were observed.

UV-Vis data were recorded using an Agilent Technologies Cary 8454 UV-Visible Diode Array Spectrophotometer monitoring from 190-500 nm. Absorbance measurements were conducted using 1 cm pathlength cuvettes. Isooctane was first run as a blank as it does not exhibit absorbance between 190-500 nm.

Table 3 summarizes the uptake of DIAD in SSZ-121 and several other molecular sieves of known structure.

TABLE 3

| Molecular Sieve | Pore Size Type | % DIAD Removed |
| --- | --- | --- |
| SSZ-13 (CHA) | Small (3-D) | None |
| ZSM-5 (MFI) | Medium (3-D) | 40% |
| LZ-210 (FAU) | Large (3-D) | 90% |
| SSZ-121 | Unknown | 75% |

Example 4

Constraint Index

Constraint Index is a test to determine shape-selective catalytic behavior in zeolites. It compares the reaction rates for the cracking of n-hexane and its isomer 3-methylpentane under competitive conditions (see, e.g., V. J. Frillette et al., *J. Catal.* 1981, 67, 218-222).

The hydrogen form of the molecular sieve of Example 2 was pelletized at 4 kpsi, crushed and granulated to 20-40 mesh. A 0.6 g sample of the granulated material was calcined in air at 540° C. for 4 hours and cooled in a desiccator to ensure dryness. Then, 0.47 g of material was packed into a ¼ inch stainless steel tube with alundum on both sides of the molecular sieve bed. A furnace (Applied Test Systems, Inc.) was used to heat the reactor tube. Nitrogen was introduced into the reactor tube at 9.4 mL/min and at atmospheric pressure. The reactor was heated to about 800° F. (427° C.), and a 50/50 feed of n-hexane and 3-methylpentane was introduced into the reactor at a rate of 8 μL/min. The feed was delivered by an ISCO pump. Direct sampling into a GC began after 15 minutes of feed introduction. Test data results after 136 minutes on stream (800° F.) are presented in Table 4.

TABLE 4

| Constraint Index Test | |
| --- | --- |
| n-Hexane Conversion, % | 2.8 |
| 3-Methylpentane Conversion, % | 4.9 |
| Feed Conversion, % | 3.9 |
| Constraint Index (excluding 2-methylpentane) | 0.56 |
| Constraint Index (including 2-methylpentane) | 0.56 |

Example 5

Example 1 was repeated except that Zeolyst CBV780 Y-zeolite (SiO₂/Al₂O₃ molar ratio=80) was used as the FAU source. Powder XRD showed the product to be SSZ-121.

The as-synthesized molecular sieve was exposed to ozone at 150° C. for 6 hours.

Figure 3:
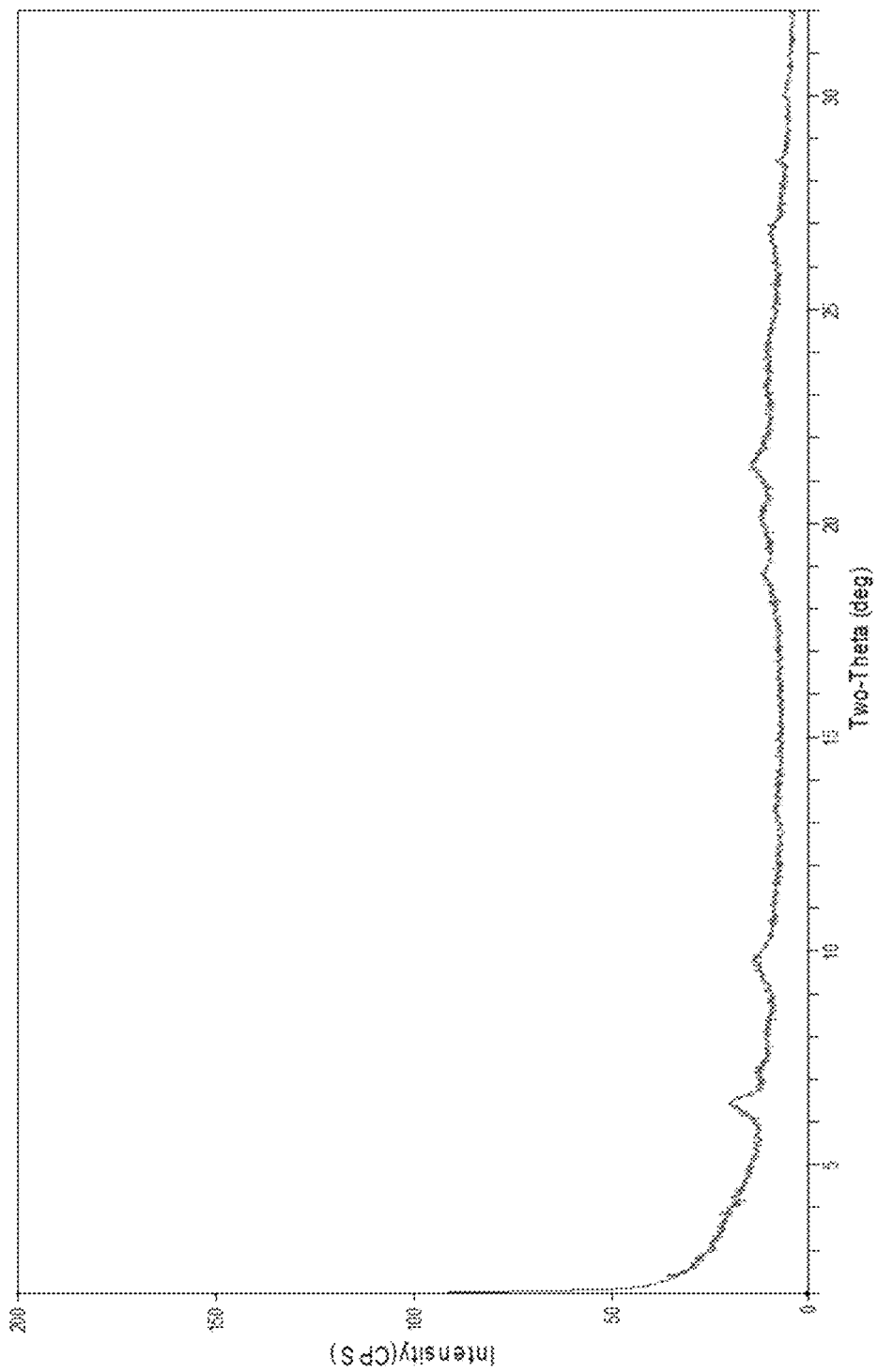
FIG. 3 shows a powder XRD pattern of the ozone treated molecular sieve of Example 5.

Powder XRD of the ozone treated product gave the pattern indicated in FIG. 3.

Example 6

Example 1 was repeated except that Zeolyst CBV760 Y-zeolite (SiO₂/Al₂O₃ molar ratio=60) was used as the FAU source. The recovered as-synthesized product was calcined as described in Example 2. Powder XRD showed the calcined product to be SSZ-121.

Analysis of the calcined product by the t-plot method of nitrogen physisorption shows the sample possessed a micropore volume of 0.18 cm³/g and an external surface area of greater than 300 m²/g. The high external surface area indicates that the material is composed of very small crystals.

Example 7

Example 1 was repeated except that Zeolyst CBV720 Y-zeolite (SiO₂/Al₂O₃ molar ratio=30) was used as the FAU source. Powder XRD showed the product to be SSZ-121.

The recovered as-synthesized product was calcined as described in Example 2.

Analysis of the calcined product by the t-plot method of nitrogen physisorption showed the sample had a micropore volume of 0.22 cm³/g.

Example 8

Brønsted Acidity

Brønsted acidity of the molecular sieve of Example 6 in its calcined form was determined by n-propylamine temperature-programmed desorption (TPD) adapted from the published descriptions by T. J. Gricus Kofke et al. (*J. Catal.* 1988, 114, 34-45); T. J. Gricus Kofke et al. (*J. Catal.* 1989, 115, 265-272); and J. G. Tittensor et al. (*J. Catal.* 1992, 138, 714-720). A sample was pre-treated at 400° C.-500° C. for 1 hour in flowing dry $H_2$. The dehydrated sample was then cooled down to 120° C. in flowing dry helium and held at 120° C. for 30 minutes in a flowing helium saturated with n-propylamine for adsorption. The n-propylamine-saturated sample was then heated up to 500° C. at a rate of 10° C./minute in flowing dry helium. The Brønsted acidity was calculated based on the weight loss vs. temperature by thermogravimetric analysis (TGA) and effluent $NH_3$ and propene by mass spectrometry. The sample had a Brønsted acidity of 295.63 μmol/g, indicating that aluminum sites are incorporated into the framework of the molecular sieve.

The invention claimed is:

1. A molecular sieve having, in its calcined form, a powder X-ray diffraction pattern with at least the following 2-theta scattering angles: 6.5±0.2, 9.5±0.2, 13.0±0.2, 18.5±0.2, 19.8±0.2, 21.2±0.2, 24.0±0.2, 25.0±0.2, 26.5±0.2, 28.5±0.2 and 30.0±0.2 degrees 2-theta.

2. The molecular sieve of claim 1, and having a composition comprising the molar relationship:

wherein n is ≥30.

3. The molecular sieve of claim 1, and having a composition comprising the molar relationship:

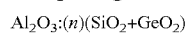

wherein n is ≥50.

4. A molecular sieve having, in its as-synthesized form, a powder X-ray diffraction pattern with at least the following 2-theta scattering angles: 6.3±0.2, 7.0±0.2, 9.5±0.2, 13.0±0.2, 16.0±0.2, 18.5±0.2, 19.8±0.2, 21.2±0.2, 24±0.2, 25.0±0.2, 26.5±0.2, 28.5±0.2 and 30.0±0.2 degrees 2-θ.

5. The molecular sieve of claim 4, having a chemical composition comprising the following molar relationship:

| | |
|---|---|
| $(SiO_2 + GeO_2)/Al_2O_3$ | ≥30 |
| $Q/(SiO_2 + GeO_2)$ | >0 to 0.1 | wherein Q comprises 1,3-bis(1-adamantyl)imidazolium cations.

6. The molecular sieve of claim 4, having a chemical composition comprising the following molar relationship:

| | |
|---|---|
| $(SiO_2 + GeO_2)/Al_2O_3$ | ≥50 |
| $Q/(SiO_2 + GeO_2)$ | >0 to 0.1 | wherein Q comprises 1,3-bis(1-adamantyl)imidazolium cations.

7. A method of synthesizing the molecular sieve of claim 4, the method comprising:
(1) preparing a reaction mixture comprising:
 (a) a FAU framework type zeolite;
 (b) a source of germanium;
 (c) a structure directing agent comprising 1,3-bis(1-adamantyl)imidazolium cations (Q);
 (d) a source of fluoride ions; and
 (e) water; and
(2) subjecting the reaction mixture to crystallization conditions sufficient to form crystals of the molecular sieve.

8. The method of claim 7, wherein the reaction mixture has a composition, in terms of molar ratios, as follows:

| | |
|---|---|
| $(SiO_2 + GeO_2)/Al_2O_3$ | 30 to 600 |
| $Q/(SiO_2 + GeO_2)$ | 0.10 to 1.00 |
| $F/(SiO_2 + GeO_2)$ | 0.10 to 1.00 |
| $H_2O/(SiO_2 + GeO_2)$ | 2 to 10. |

9. The method of claim 7, wherein the reaction mixture has a composition, in terms of molar ratios, as follows:

| | |
|---|---|
| $(SiO_2 + GeO_2)/Al_2O_3$ | 60 to 500 |
| $Q/(SiO_2 + GeO_2)$ | 0.20 to 0.70 |
| $F/(SiO_2 + GeO_2)$ | 0.20 to 0.70 |
| $H_2O/(SiO_2 + GeO_2)$ | 4 to 8. |

10. The method of claim 7, wherein the FAU framework type zeolite is zeolite Y.

11. The method of claim 7, wherein the crystallization conditions include a temperature of from 100° C. to 200° C.

12. The method of claim 7, wherein the reaction mixture has a molar ratio of Q/F in a range of from 0.8 to 1.2.

13. A process for converting a feedstock comprising an organic compound to a conversion product, the process comprising contacting the feedstock at organic compound conversion conditions with a catalyst comprising the molecular sieve of claim 1.

* * * * *